(12) United States Patent
Lee et al.

(10) Patent No.: US 12,139,235 B2
(45) Date of Patent: Nov. 12, 2024

(54) STRUCTURAL ENERGY STORAGE FOR CF BASED POWERED MOBILE DEVICES

(71) Applicant: TOYOTA MOTOR ENGINEERING & MANUFACTURING NORTH AMERICA, INC., Plano, TX (US)

(72) Inventors: Jae Seung Lee, Ann Arbor, MI (US); Paul Gilmore, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 234 days.

(21) Appl. No.: 17/574,660

(22) Filed: Jan. 13, 2022

(65) Prior Publication Data

US 2023/0219652 A1 Jul. 13, 2023

(51) Int. Cl.
| | |
|---|---|
| *B60K 1/04* | (2019.01) |
| *B62K 19/16* | (2006.01) |
| *B62K 19/30* | (2006.01) |
| *B62M 6/60* | (2010.01) |
| *B62M 6/90* | (2010.01) |
| *H01M 4/66* | (2006.01) |

(52) U.S. Cl.
CPC ............... *B62M 6/90* (2013.01); *B62K 19/16* (2013.01); *B62K 19/30* (2013.01); *B62M 6/60* (2013.01); *H01M 4/663* (2013.01); *H01M 4/668* (2013.01)

(58) Field of Classification Search
CPC .......... B62M 6/90; B62M 6/60; H01M 4/663; H01M 4/668; B60K 1/04
See application file for complete search history.

(56) References Cited

U.S. PATENT DOCUMENTS

| | | | |
|---|---|---|---|
| 7,750,790 B2 | 7/2010 | Yang et al. | |
| 8,770,326 B2 * | 7/2014 | Matano | B60K 1/00 180/65.1 |
| 10,082,913 B2 | 9/2018 | Moller et al. | |
| 10,893,608 B2 | 1/2021 | Chou et al. | |
| 2002/0076948 A1 | 6/2002 | Farrell et al. | |

(Continued)

FOREIGN PATENT DOCUMENTS

| | | | |
|---|---|---|---|
| CN | 107926117 B | 8/2020 | |
| KR | 10-1632109 B1 | 6/2016 | |
| WO | WO-2008010814 A2 * | 1/2008 | B60L 5/005 |

OTHER PUBLICATIONS

Till Julian Adam, et al., "Multifunctional Composites for Future Energy Storage in Aerospace Structures", Energies, vol. 11, Issue 2: 335, 2018, pp. 1-21.

*Primary Examiner* — Jason D Shanske
*Assistant Examiner* — James J Triggs
(74) *Attorney, Agent, or Firm* — Oblon, McClelland, Maier & Neustadt, L.L.P.

(57) ABSTRACT

An electric mobility apparatus that can include at least one electric carbon fiber component. The electric carbon fiber component incorporating a structural battery, the structural battery including energy storage devices, each of the energy storage devices having an anode core of a continuous carbon fiber, an electrolyte arranged on the at least one continuous carbon fiber core, and a cathode layer arranged to the continuous carbon fiber core on the electrolyte. An interface is electrically connected to the structural battery, the interface for inputting power for charging the structural battery and for outputting power.

20 Claims, 15 Drawing Sheets

(56) References Cited

U.S. PATENT DOCUMENTS

| | | | |
|---|---|---|---|
| 2002/0121146 A1 | 9/2002 | Manaresi et al. | |
| 2005/0092538 A1* | 5/2005 | Baldwin | B62K 11/10 180/220 |
| 2010/0206614 A1 | 8/2010 | Park et al. | |
| 2011/0095574 A1* | 4/2011 | Brown | B32B 9/046 156/290 |
| 2011/0168468 A1* | 7/2011 | Taguchi | B60L 15/20 180/65.245 |
| 2016/0056482 A1* | 2/2016 | Otsuka | H01M 8/0444 180/220 |
| 2017/0233902 A1 | 8/2017 | Grant et al. | |
| 2021/0100452 A1 | 4/2021 | Brister et al. | |
| 2022/0219784 A1* | 7/2022 | Bruneau | B60K 1/04 |

\* cited by examiner

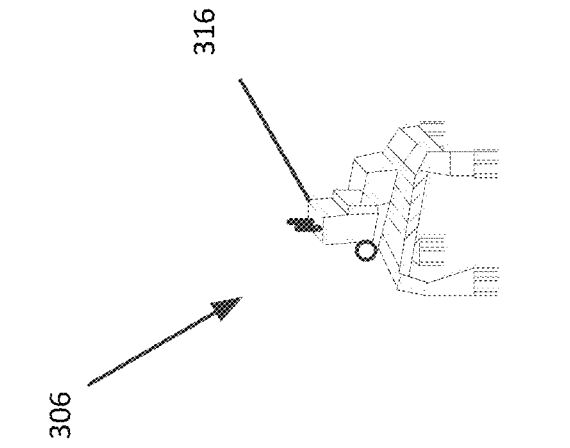
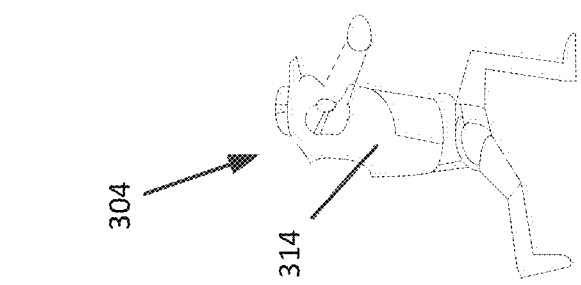
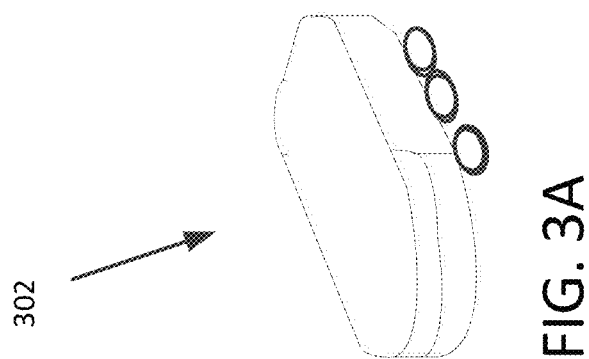

STRUCTURAL ENERGY STORAGE FOR CF BASED POWERED MOBILE DEVICES

CROSS-REFERENCE TO RELATED APPLICATIONS

This application is related to non-provisional application Ser. No. 17/372,629 filed Jul. 12, 2021, the entire contents of which are incorporated herein by reference.

This patent application is also related to non-provisional application Ser. No. 17/574,621, filed Jan. 13, 2022, entitled "STRUCTURAL ENERGY STORAGE WITH CARBON FIBER FOR SPORT EQUIPMENT SENSOR" which is filed concurrently herewith, the entire contents of which are incorporated herein by reference.

This patent application is also related to non-provisional application Ser. No. 17,574,685, filed Jan. 13, 2022, entitled "STRUCTURAL ENERGY STORAGE FOR CF BASED PERSONAL MOBILITY AND LIGHTWEIGHT DELIVERY" which is filed concurrently herewith, the entire contents of which are incorporated herein by reference.

This patent application is also related to non-provisional application Ser. No. 17,574,642, filed Jan. 13, 2022, entitled "APPLICATION OF STRUCTURAL ENERGY STORAGE WITH CARBON FIBER IN PERSONAL WEARABLE AND CARRIABLE DEVICES" which is filed concurrently herewith, the entire contents of which are incorporated herein by reference.

FIELD OF THE DISCLOSURE

This disclosure is directed to structural energy storage devices, containing a plurality of lithium ion batteries having an anode of a continuous carbon fiber core, applied to powered mobile devices in order to compensate for weight to power sensors and alleviate problems associated with battery positioning and the effects of a battery on weight balance.

DISCUSSION OF THE BACKGROUND

Carbon fiber composite material is being widely adopted in frames for e-mobility, including E-bicycle and E-scooter, self-driving mobility and robots, as well as electronic sensors for performance bicycles. These example applications would benefit from lighter weight and reduced space requirements, so that a carbon fiber composite material becomes a viable solution. These applications may be categorized based on how a carbon fiber composite battery may be applied.

One category of application is a carbon fiber frame in an E-bicycle or E-scooter. A traditional e-bike typically adopts an electrified powertrain with battery pack. The powertrain with battery pack are additive components so that the battery and the battery housing which protects the battery increases overall weight of a bicycle. Also, the weight balance of overall structure is disturbed since the location of battery placement is limited.

FIGS. 1A, 1B illustrate examples of conventional E-bikes. A traditional E-bike 102 includes a battery pack 104, either installed inside the frame, or attached to the frame. For modern e-bikes like a racing road-bike 112 of FIG. 1B, whose overall weight and aerodynamics are in design priorities, a removable battery pack 114 is integrated inside a main frame 116. The racing road-bike 112 may include a power button 118 to turn on and off a power to sensors in order to conserve energy when sensors are not needed. Most high-end racing road bikes 112 use carbon fiber as a main frame material to reduce the weight of the bike. The traditional E-bike 102 may also include a carbon-fiber frame 106. However, the battery pack 104 or 114 disturbs the overall weight balance because of a restriction to mount a battery pack to certain locations on the frame. Also, battery capacity is limited by internal space availability, especially in the case of a racing road bike of the bike's frame. The carbon fiber has only one function, structural support for the frame with reduced weight.

FIG. 2 illustrates a typical E-scooter. An E-scooter may include carbon fiber in components of the frame 202. A battery pack 210 may be mounted in a compartment below the foot board 206. An entire compartment containing the battery pack 210 may be removable, or the battery pack 210 itself, may be removed from the compartment. Some E-scooters are equipped with Lithium Ion battery packs as the battery pack.

A second category of application is self-driving mobility and robots. FIGS. 3A-3C illustrate examples of self-driving mobility devices and walking robots. For example, a self-driving mobility 302 as in FIG. 3A preferably has minimum weight in order to extend travel distance on a charged battery. Subsequently, weight reduction is a main factor in design of a mobile self-driving vehicle. Likewise, humanoid robot 304 as in FIG. 3B or a walking robot 306 as in FIG. 3C are preferably of light weight in order to conserve energy usage. However, in each application the battery pack 314, 316 is preferably as large as possible in order to power motors and sensors, and maximize travel distance between charges.

A third category of application is measurement of performance parameters such as power and cadence with sensors mounted on components of a performance bicycle. Power may be measured using electronics located within a power meter. A power meter may use a strain gauge which converts flex into an electrical resistance. Based on the amount of electrical resistance, the power meter can calculate how much torque the rider is generating. Cadence of the rider may be measured using an accelerometer and gyroscope.

FIGS. 4A, 4B illustrate operation of a strain gage circuit that is generally used in power meters for performance bicycles. In the case of a crank arm-based power meter for example, the strain gauge measures how much a crank arm is flexing when the pedals are being pushed down. In FIG. 4A, tension in a longitudinal direction 408 causes the width 406 of the area of the circuit 402 to narrow, which leads to an increase in resistance along the circuit 402. The output 404 of the circuit 402 is a high resistance level. In FIG. 4B, compression in the longitudinal direction 418 causes width 416 of the circuit 412 to expand, causing the resistance along the circuit 412 to decrease. The output 414 of the circuit 412 is a low resistance level.

Also, different components may be configured with power meter electronics. For example, a crank-based power meter has the power sensors and electronics built into the crank. A pedal-based power meter has the sensors and electronics located in the pedals. FIG. 5A illustrates an example of a crankset power meter for a performance bicycle. FIG. 5B illustrates an example of a crank arm power meter. FIG. 5C illustrates an example of pedals having a power meter. FIG. 5D illustrates an example of a disc hub having a power meter. In each case, a battery is used to provide electrical power for the power meter and other sensors. Although the battery may be a small coin battery, the battery housing and battery together take up substantial space on small components where space is limited and it is preferable to minimize size of extra parts. Data from sensors including a power meter is generally transmitted wirelessly to an external computer, which calculates parameters such as maximum power and average power, and some cases can monitor heart rate, speed, distance, time, based on measurements from other sensors.

The crankset power meter of FIG. 5A includes a power meter to measure power and power balance for left and right legs separately. A wireless communication module allows for data monitoring and firmware updates.

The crank arm power meter of FIG. 5B includes a strain gage for power measurement, an accelerometer and gyroscope for cadence measurement, a communication module, such as Bluetooth low energy, for transmission of sensor signals, and a replaceable battery. The power meter may include firmware for controlling the sensors.

The power meter pedals of FIG. 5C include a battery operated dual-sensing power meter that measures total power, cadence, left/right balance, seated versus standing, platform center offset, and power phase. The power meter can monitor how power is applied throughout the pedal stroke. Some power meter pedals provide a rechargeable battery.

The power meter disc hub of FIG. 5D locates the battery operated strain gauges in the rear hub.

Each of these categories of application uses the carbon fiber composite as structure by which weight can be reduced. However, these categories of application use batteries as a power source, which take up valuable space and can add, sometimes, substantial weight.

SUMMARY OF THE DISCLOSURE

An aspect is an electric mobility apparatus, that can include at least one electric carbon fiber component, the at least one electric carbon fiber component incorporating a structural battery, the structural battery including one or more energy storage devices, each of the one or more energy storage devices having at least one anode core of a continuous carbon fiber, an electrolyte arranged on the at least one continuous carbon fiber core, and a cathode layer arranged to the at least one continuous carbon fiber core on the electrolyte. At least one interface is electrically connected to the structural battery, the interface for inputting power for charging the structural battery and for outputting power.

A further aspect is an electric mobility apparatus that can include at least one electric motor, at least one electric carbon fiber component incorporating a structural battery, the structural battery including one or more energy storage devices, each of the one or more energy storage devices having at least one anode core of a continuous carbon fiber, an electrolyte arranged on the at least one continuous carbon fiber core, and a cathode layer arranged to the at least one continuous carbon fiber core on the electrolyte. The structural battery outputting power for driving the electric motor, thereby driving the electric mobility apparatus.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A-3C illustrate conventional examples of self-driving vehicle and walking robot.

DETAILED DESCRIPTION OF THE PREFERRED EMBODIMENTS

Figure 1B:
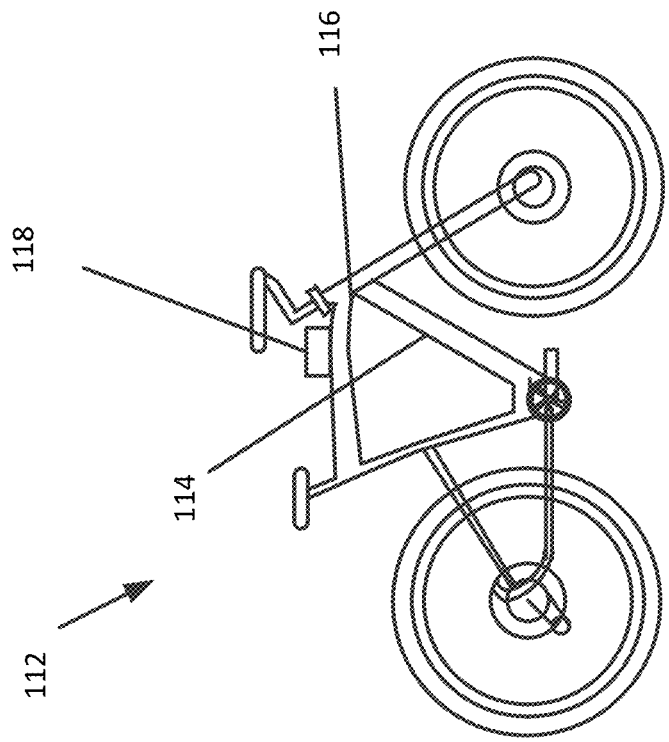
FIGS. 1A, 1B illustrate examples of conventional E-bicycle and road-bike.
Figure 1A:
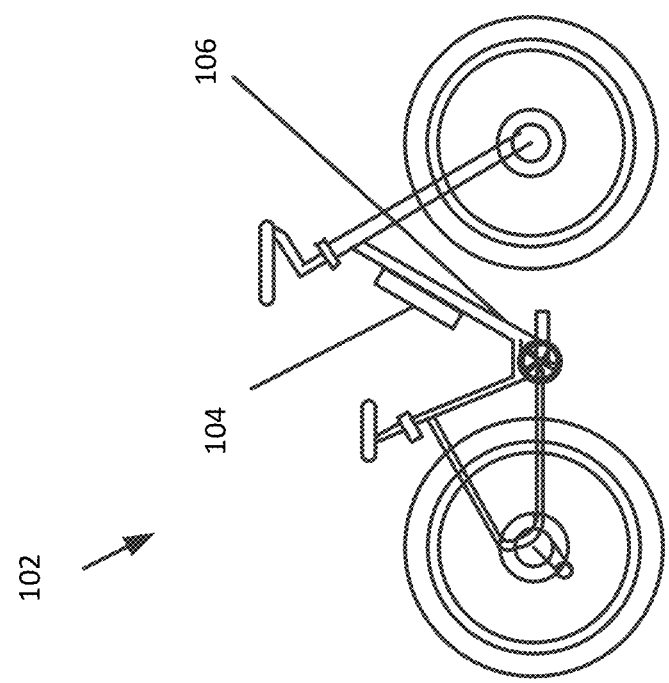
Figure 2:
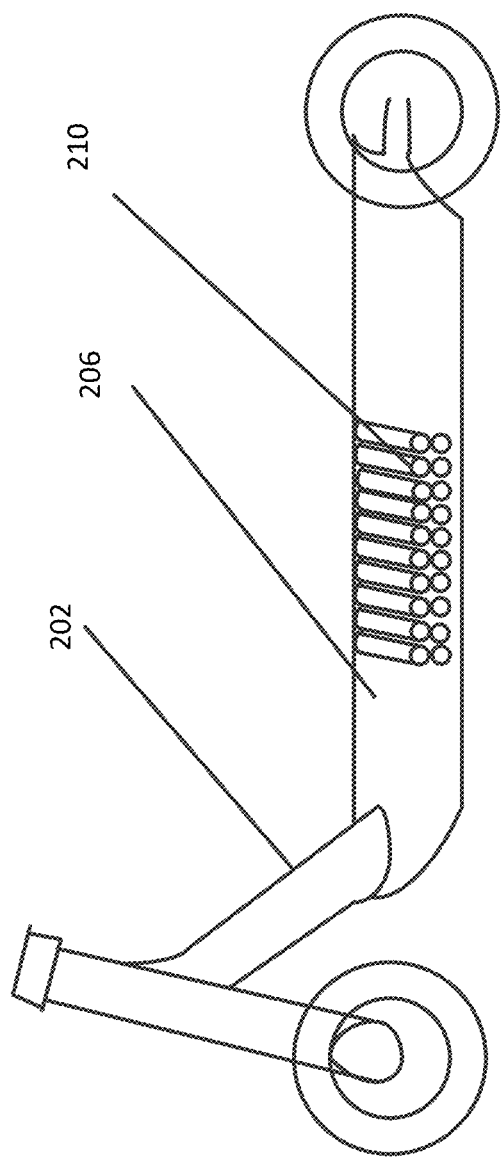
FIG. 2 illustrates an example of conventional E-scooter.
Figures 4A, 4B:
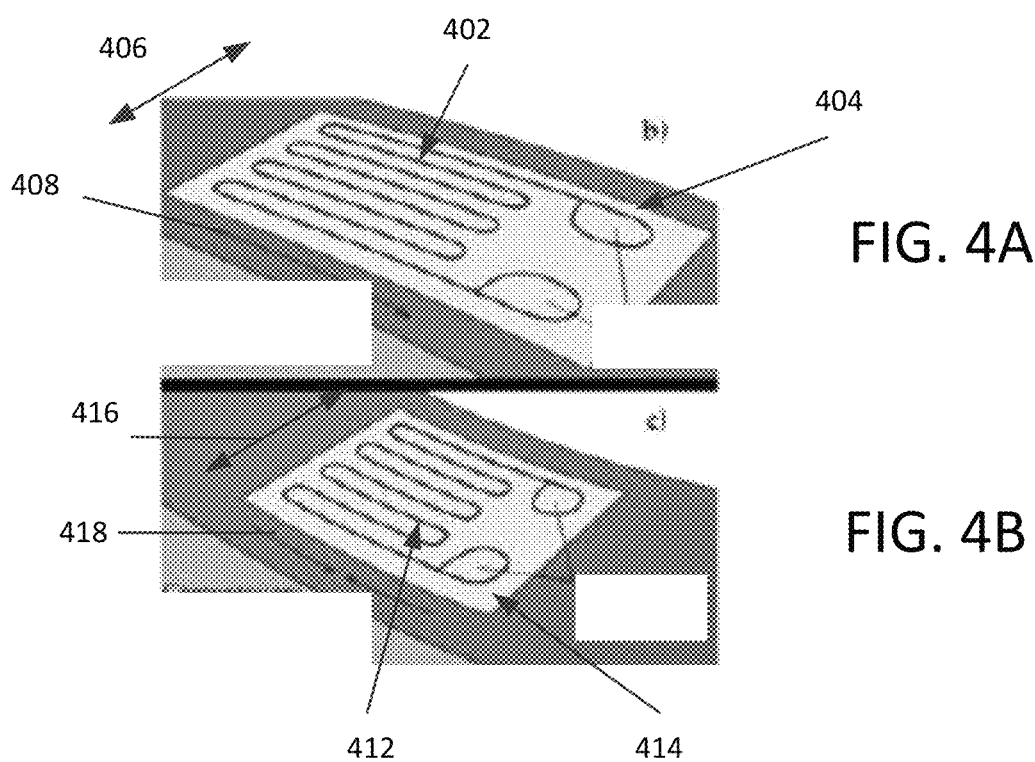
FIGS. 4A, 4B illustrates operation of a strain gage circuit that is generally used in power meters for performance bicycles.
Figure 5C:
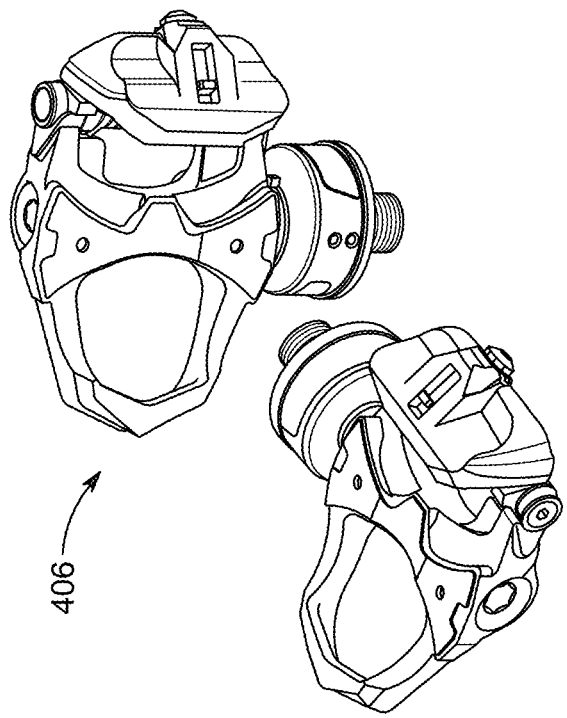
FIGS. 5A, 5B, 5C, 5D illustrate conventional examples of E-bike components having performance sensor electronics.
Figure 5D:
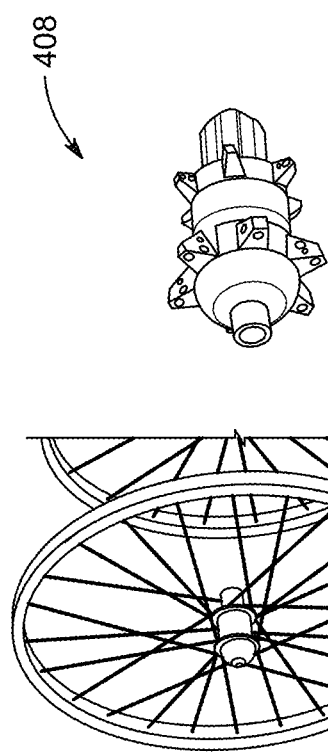
Figure 5B:
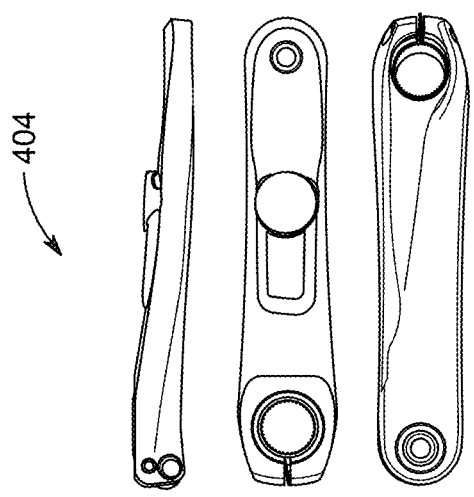
Figure 5A:
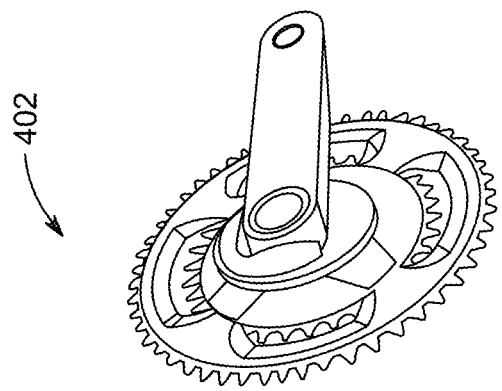

As used herein, the words "a" and "an" and the like carry the meaning of "one or more." The phrases "selected from the group consisting of" "chosen from," and the like include mixtures of the specified materials. Terms such as "contain (s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

Disclosed embodiments relate to a structural energy storage formed in CF to supply electricity which facilitates various added features, motors, or sensors either embedded in or attached on devices for personal mobility and lightweight delivery. The electricity can be used to operate embedded sensors, support actuation, heat or cool etc. The inventors recognized that a structural battery employing a carbon fiber core anode can bring about a power source without much increase in size and weight. In an ideal case, if the structural battery has the same energy density and stiffness as a conventional battery and structure respectively, the mass of an added feature, motor, sensor unit may be reduced by as much as 25-35%. However, even if the ideal is not achieved, significant weight savings would still be possible depending on the structural mass efficiency and structural energy efficiency attained with the device. Moreover, the structural battery employing a carbon fiber core anode may be extended to a wide range of utilities by providing energy storage in addition to structural form and support of carbon fiber composite materials.

The structural battery includes two main components:

1. A mechanically compliant electrolyte coated onto the carbon fiber that acts as a mechanical buffer layer between the carbon fiber and cathode while simultaneously conducting lithium ions.

2. A composite cathode designed to have a very low volume expansion by embedding active material particles in a conductive polymer matrix.

The mechanically compliant electrolyte may have low stiffness but provides good adhesion to the anode and cathode.

In some embodiments, a structural battery may include one or more coaxial energy storage devices. A coaxial energy storage device may be prepared by first coating a continuous carbon fiber with an electrolyte precursor coating solution containing a lithium salt, a polymer or monomer which solvates lithium ion, a gel or elastomer matrix polymer or oligomer, a UV sensitive cross-linking agent, a photoinitiator and a plasticizer. The polymer or monomer which solvates lithium ion and the gel or elastomer matrix polymer or oligomer may be the same material and correspond to the polymers used for the electrolyte or the precursors thereof.

The lithium salt provided in the gel or elastomer of the electrolyte coating comprises at least one selected from the group consisting of LiTFSI, LiBF$_4$, LiPF$_6$, LiClO$_4$, LiCF$_3$SO$_3$, LiCl and LiAsF$_6$. Combinations of these may be employed and other additives to enhance lithium ion conductivity may be included.

Conventionally known photoinitiators compatible with the polymer and/or oligomer are employed and may include but are not limited to any of aminoacetophenones, phosphine oxides, benzophenones, benzyl formates and thioxanthones. Such photoinitiators are commercially available.

The cross-linking agent employed is determined by the polymer of oligomer structure and is well known to one of skill in the art.

The electrolyte material composition is dissolved in a carbonate solvent or ether solvent system and my then be applied to the continuous carbon fiber by any suitable coating method which applies a uniform and complete coating to the entire carbon fiber surface. In preparing the electrolyte coating composition it is necessary to prepare a composition which forms a contact angle on the carbon fiber surface of 100° or less. The lower the contact angle the thinner the coating that can be applied to the carbon fiber. The contact angle may be controlled by selection of solvent and plasticizer, concentration of the lithium salt and polymer, and temperature. In one embodiment, the electrolyte may also be coated onto the carbon fibers using vacuum bagging or vacuum infusion technique. The electrolyte precursor solution can be infiltrated into the carbon fiber.

Figure 6:
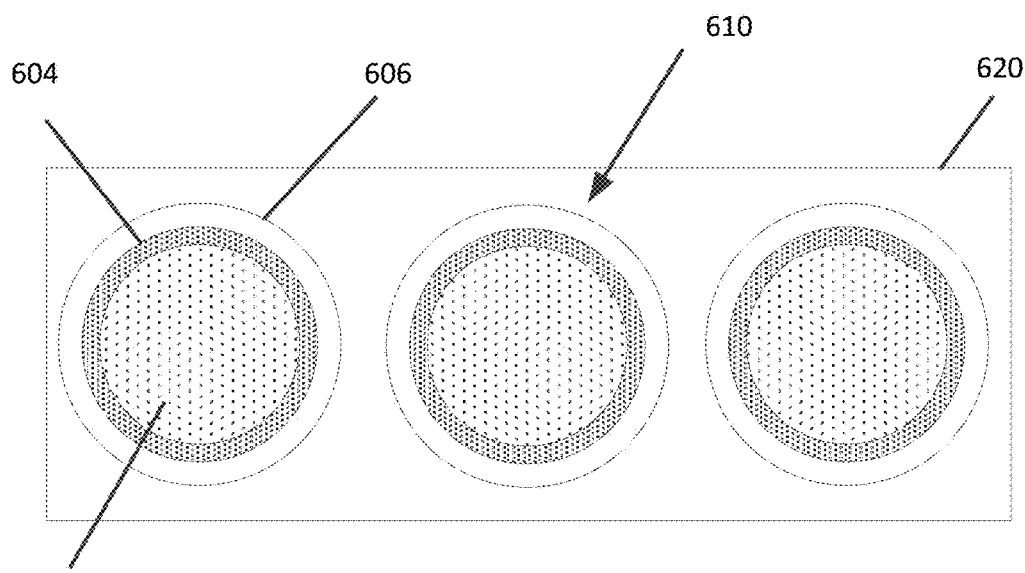
FIG. 6 shows a schematic drawing of a structural arrangement of coaxial energy storage devices in a shell according to an embodiment of the disclosure.

FIG. 6 shows a schematic drawing of a structural arrangement of coaxial energy storage devices in a shell according to an embodiment of the disclosure. Once the electrolyte coating 604 is applied to the continuous carbon fiber 602, it is exposed to UV irradiation to cure the polymer matrix coaxially arranged about the carbon fiber which is now the core of the device. The solvent can remain in order to obtain the elastic electrolyte coating layer.

Next the cathode coating 606 is applied to the surface of the elastic electrolyte coating 604.

A plurality of the coaxial energy storage device 610 is arranged within a shaped composite battery structure 600 having a shell 620 or outer coating and an inner matrix enclosed by the shell. The matrix encloses the plurality of coaxial energy storage devices 610.

Figure 7:
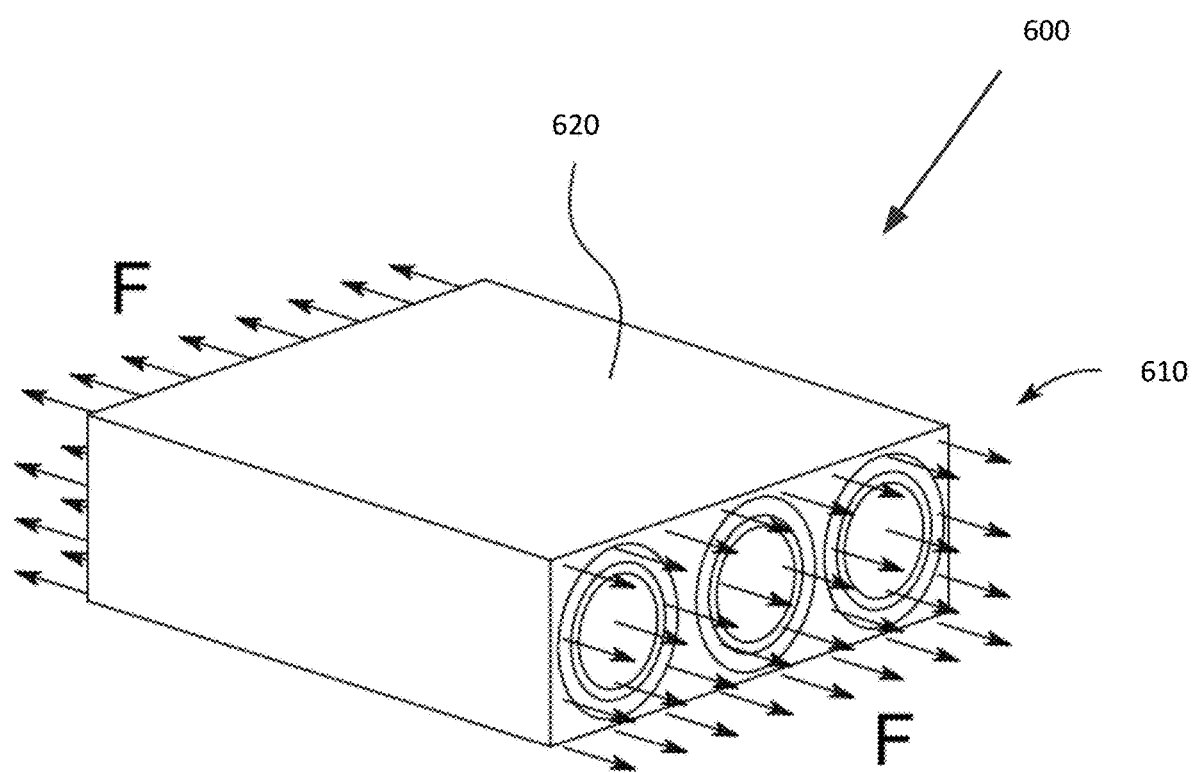
FIG. 7 shows another schematic drawing of a structural arrangement of coaxial energy storage devices in a shell according to an embodiment of the disclosure.

Once the electrolyte and cathode layers are coated onto the carbon fibers, the coaxial energy storage devices 610 are arranged within a shell 620 having a structure and are subsequently impregnated with a matrix material as schematically represented in FIG. 7 The composite battery structure 600 (referred to herein as a coaxial arranged carbon fiber (CF) battery, or simply coaxially arranged battery) schematically represented in FIG. 7 with embedded energy storage can be formed to perform in a wide variety of structural applications while providing electrical power to devices requiring energy or supplementing the energy requirement of the device.

The shell 620 may be composed of a metal and/or a fiber reinforced plastic. Materials employed for such sandwich shell matrix composites are conventionally known for example in the construction of airplane components, automobile components, protective equipment and other vehicles for transportation and sport. In particular, the matrix enclosed by the shell 620 may comprise a resin selected from the group consisting of (meth)acrylate resins, epoxy resins, diallyl phthalate resins and phenolic resins.

The coaxial energy storage devices 610 may be arranged within the composite structure (coaxially arranged battery 600) in any arrangement. For example, unidirectionally and in parallel, in a mat arrangement wherein the coaxial energy storage device are oriented both in weft and warp orientations or in only one of weft and warp while the other direction is occupied by a structural fiber such as a glass fiber, a carbon fiber or an aramid fiber.

Figure 8:
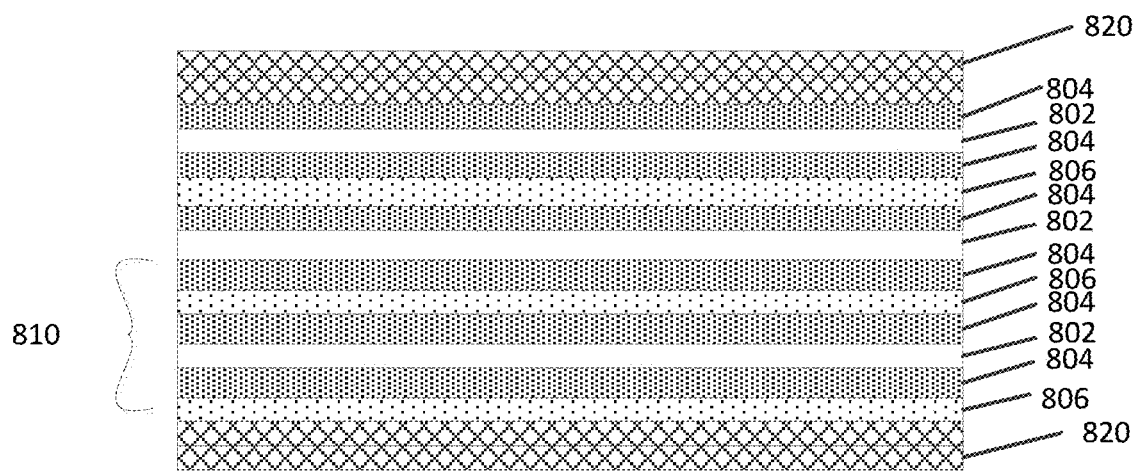
FIG. 8 shows a schematic drawing of a structural arrangement 700 of laminate energy storage devices between shell layers.

In some embodiments, a structural battery may include structural laminate energy storage devices. FIG. 8 shows a schematic drawing of a structural arrangement 800 of laminate energy storage devices between shell layers. An electrolyte layer 804 is applied to a continuous carbon layer 802 and is exposed to UV irradiation to cure the polymer matrix arranged on the carbon layer. The solvent remains in order to obtain the elastic electrolyte coating layer.

Next a cathode layer 806 is applied to a surface of the electrolyte layer 804 to forma a laminate energy storage device 810.

A plurality of the laminate storage device 810 is arranged within a shaped composite structure having a shell layer 820 or outer coating and an inner matrix enclosed by the shell. The matrix encloses the plurality of laminate energy storage devices 810.

Figure 9:
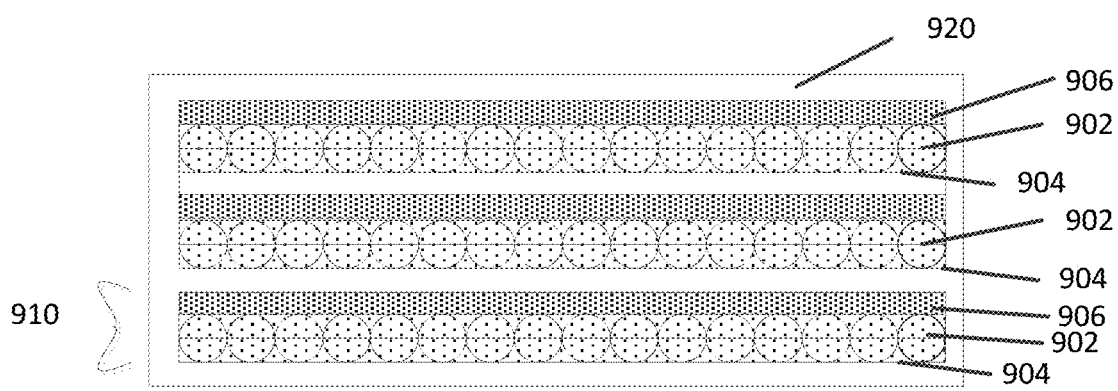
FIG. 9 shows a schematic drawing of a structural arrangement of laminate energy storage devices with carbon fibers.

In some embodiments, a structural battery may include structural laminate energy storage devices in which the carbon layer is a plurality of carbon fibers 902. FIG. 9 shows a schematic drawing of a structural arrangement of laminate energy storage devices with carbon fibers. Once an electrolyte coating 904 is applied to the continuous carbon fibers 902, it is exposed to UV irradiation to cure the polymer matrix coaxially arranged about the carbon fiber which is now the core of the device. The solvent remains in order to obtain the elastic electrolyte coating layer. A cathode layer 906 is applied to a surface of the layer of electrolyte coating 904 to form a laminate energy storage device 910. A plurality of the laminate storage device 910 is arranged within a shaped composite structure having a shell layer 920 or outer coating and an inner matrix enclosed by the shell. The matrix encloses the plurality of laminate energy storage devices 910.

Figure 10A:
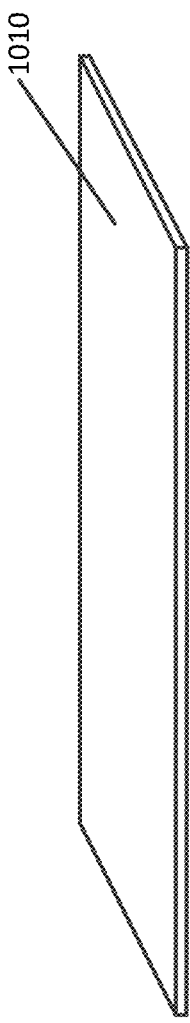
FIGS. 10A, 10B illustrate steps in forming a carbon fiber mat into a shape.
Figure 10B:
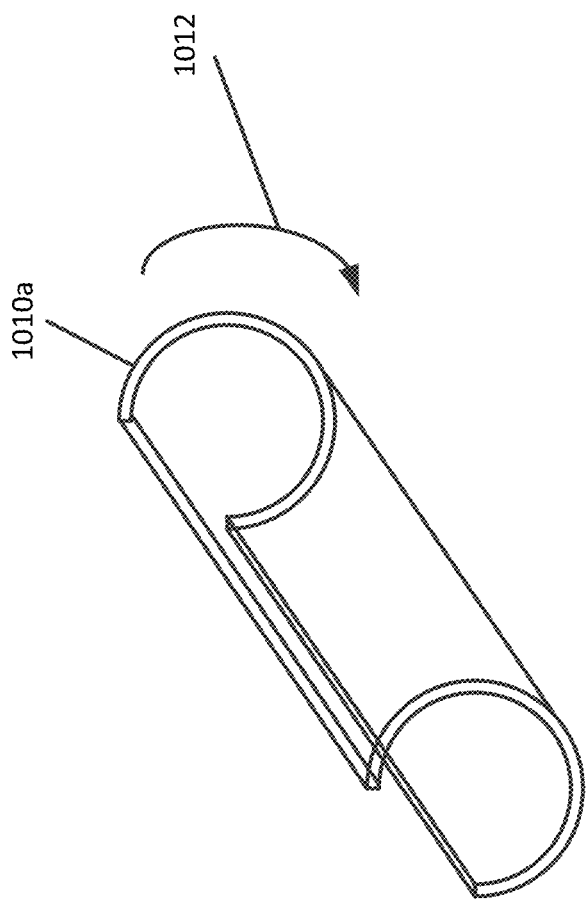

In manufacturing, the Carbon Fiber composite battery structure can be made into a mat arrangement, shaped into a desired shape, and cured. FIGS. 10A, 10B illustrate steps in forming a carbon fiber mat into a shape.

FIG. 10A shows where the carbon fiber composite structure is in a mat arrangement 1010. FIG. 10B shows where the mat is formed 1012 into a shape 1010*a*. When the desired shape is obtained, the final shape 1010*a* is cured. Although the example shape in FIG. 10B is a curved shape, other shapes may be formed depending on the structure being implemented.

Figure 11B:
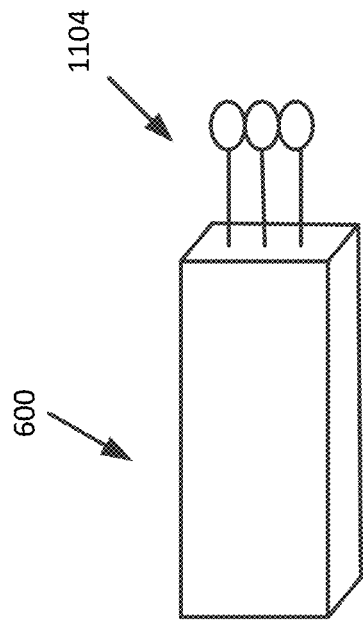
FIGS. 11A, 11B is a schematic of a connection structure for a structural battery.
Figure 11A:
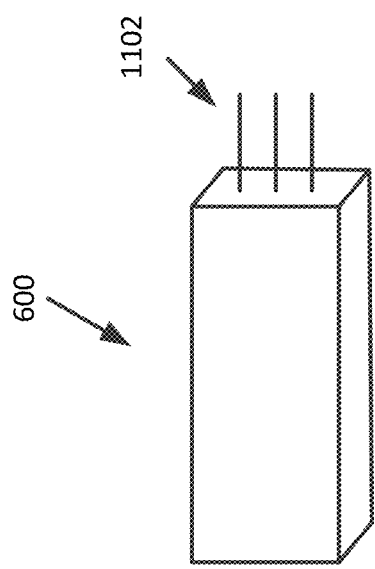

FIGS. 11A, 11B is a schematic of a connection structure for a structural CF battery. Connection to the coaxially arranged battery 600 may be by a wired connection 1102 or a wireless connection 1104. In the case of a wired connection 1102, the structural CF battery 600 may include wire terminals extending from an end of the composite structure 600. In the case of a wireless connection 1104, the structural CF battery 600 may include one or more coils at an end of the composite structure 600. In addition, the structural CF battery may be configured with a charge unit that may be connected by the wired connection 1102 or the wireless connection 1104.

As described above, high performance bicycles, such as racing road bikes, are often made with carbon fiber frames, with some main components also made of carbon fiber composites, for light weight as well as strength and stiffness. The average weight of a carbon fiber road bike is about 18 pounds (8.2 kg). A battery for an electric bike can weight about 7 pounds, although some batteries weigh as little as 3 pounds. However, a small battery can mean a low battery capacity. Although it may be possible to use a conventional battery, such as a battery installed in a main frame of a road bike, the additive components of the battery and the battery housing which protects the battery increases overall weight of bike. Also, the battery capacity is limited by internal space availability of its frame. Furthermore, the weight balance of overall structure is disturbed since the location of placement is limited.

Carbon fiber may be used as a main frame material to reduce the weight of a bike. In the e-bike case where the battery is used to assist driving power, CF-embedded energy storage can supply electric energy solely or can be used in conjunction with a conventional battery pack inside of the CF-energy embedded frame. Any part of bike which can be manufactured with CF could provide additional energy storage.

Figure 12:
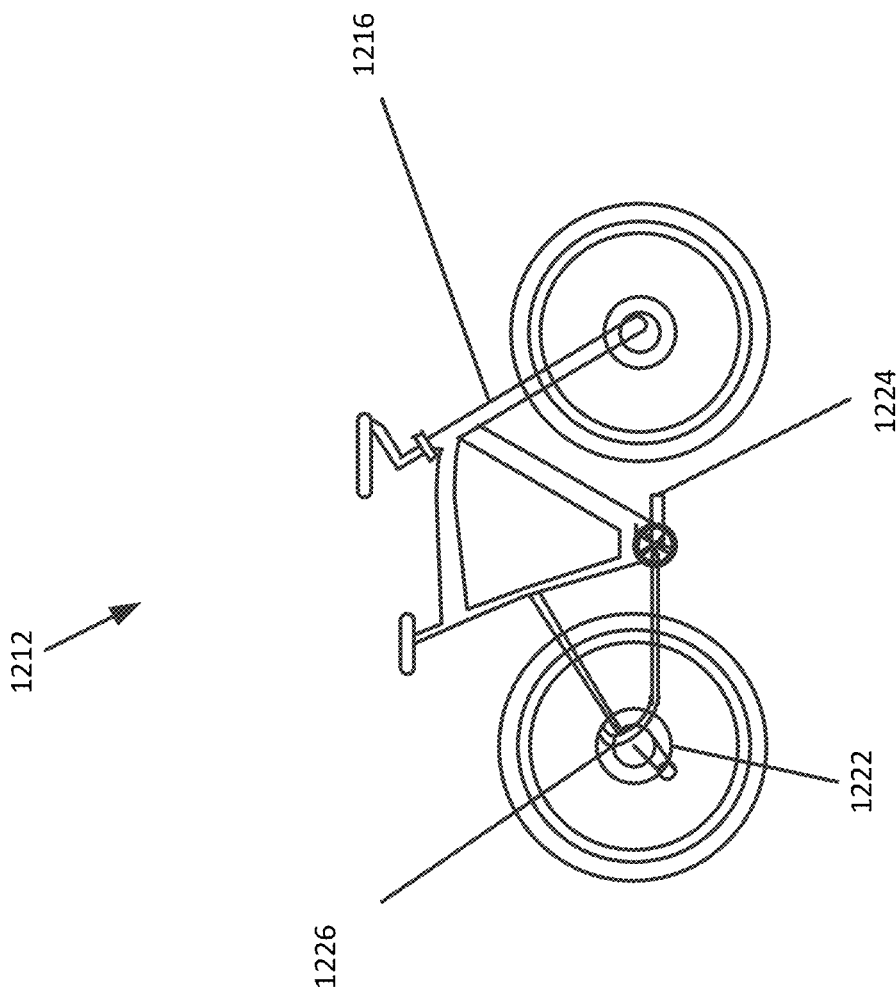
FIG. 12 is a schematic of a performance road-bike according to an embodiment of the disclosure.

FIG. 12 is a side view of a performance road bike in accordance with an embodiment of the disclosure. A performance road bike is a road bike that is equipped with one or more performance monitoring devices to provide feedback information on a person's ride. Although FIG. 12 depicts a road bike as being equipped with the performance monitoring devices, other types of bicycles can be equipped with performance monitoring devices within the present disclosure. Performance feedback information may include an amount of power exerted by one or both legs, cadence while pedaling, speed, distance, and time. Additional feedback information may include the rider's heart rate (pulse).

The main frame 1216 of the performance road bike 1212 may include a structural CF battery as part of the structure. Components of the road bike 1212 may also be composed of structural CF battery, such as the crankset 1222, pedals 1024, and one or both hubs 1226. In some embodiments, there may be several structural CF batteries of a predetermined size, or sizes, and interconnected in series or parallel to provide a required voltage or current.

In a performance bike, such as a road bike or mountain bike, it is preferable that any added sensors such as power meter, cadence and biosensor minimize added weight. Also, those added sensors may be mounted in a rotating structure such as crank, pedal, and hub, making the electric connection and battery installation challenging. In one or more embodiments, the CF-embedded energy storage can power those sensors with minimal weight addition and can eliminate the complexity of battery mounting location in each rotating structure.

Figure 13:
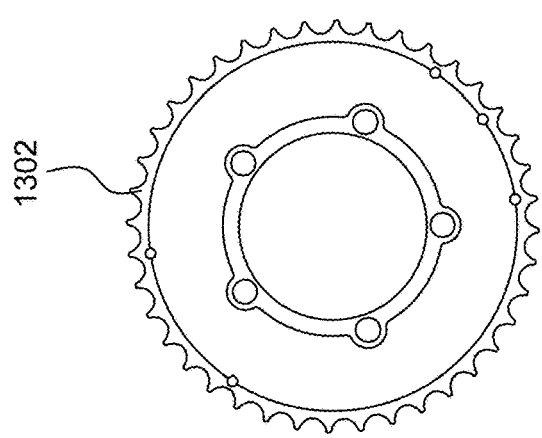
FIG. 13 illustrates a carbon fiber chainring according to an embodiment of the disclosure.

FIG. 13 illustrates a carbon fiber chainring according to an embodiment of the disclosure. Carbon fiber composite of the chainring can be configured using structural carbon fiber battery in place of some or all of the carbon fiber composite. The chainring 1302 configured as a structural CF battery can provide power for sensors. In one embodiment, the chainring 1302 may have a strain gage mounted on one or both sides of the chainring 1302. In such case, the chainring 1302 may serve as a power meter for one or both of a rider's legs. Additional electronics may be connected to the strain gage to wirelessly transmit strain gage sensor signals.

Figure 14:
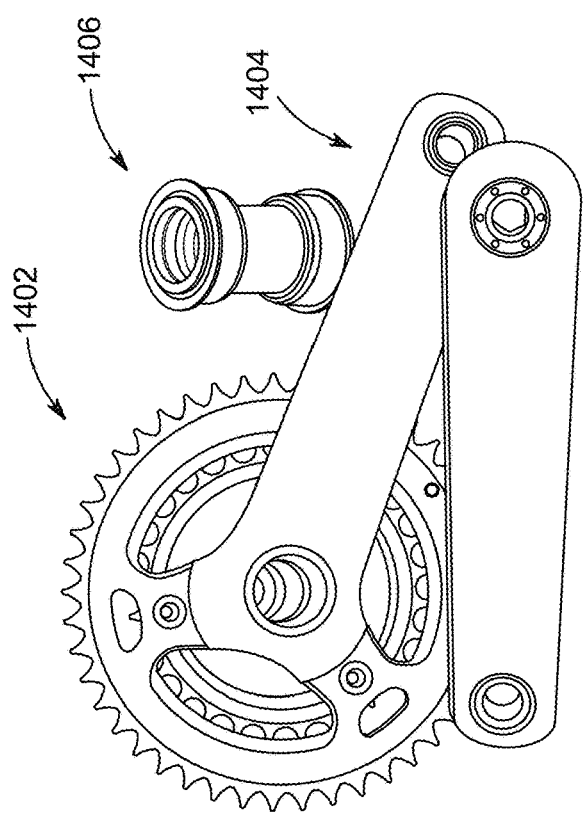
FIG. 14 illustrates carbon fiber components of a crankset according to an embodiment of the disclosure.

FIG. 14 illustrates carbon fiber components for a crankset according to an embodiment of the disclosure. A typical crankset includes a chainring together with crankarm and disc hub. Carbon fiber composite of the crankset including chainring 1402, crankarm 1404, and disc hub 1406 can each be configured using a structural carbon fiber (CF) battery. The components of the crankset, each configured as a structural CF battery, can provide power for sensors. A strain gage may be mounted to the crankarm 1404 and/or inside the disc hub 1406. Signals for both crankarms 1404 may serve as a power meter for both legs. Additional electronics may be provided including an accelerometer and gyroscope. A communication module may be provided with the sensors to wirelessly transmit sensor signals.

Figure 15:
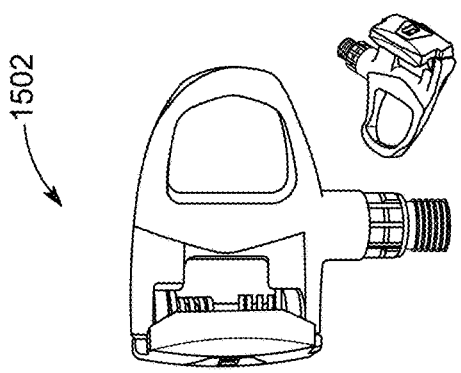
FIG. 15 illustrates a carbon fiber pedal according to an embodiment of the disclosure.

FIG. 15 illustrates a carbon fiber pedal according to an embodiment of the disclosure. Portions of the pedal 1502 for clamping to cyclist cleats may be configured as a structural CF battery. The threaded bolt for attaching the pedal may be a conventional metal bolt. A strain gage may be mounted within the pedal 1502. The combination of both pedals 1502 may provide signals for determining power balance. A communication module may be provided with the sensors to wirelessly transmit sensor signals.

Figure 16:
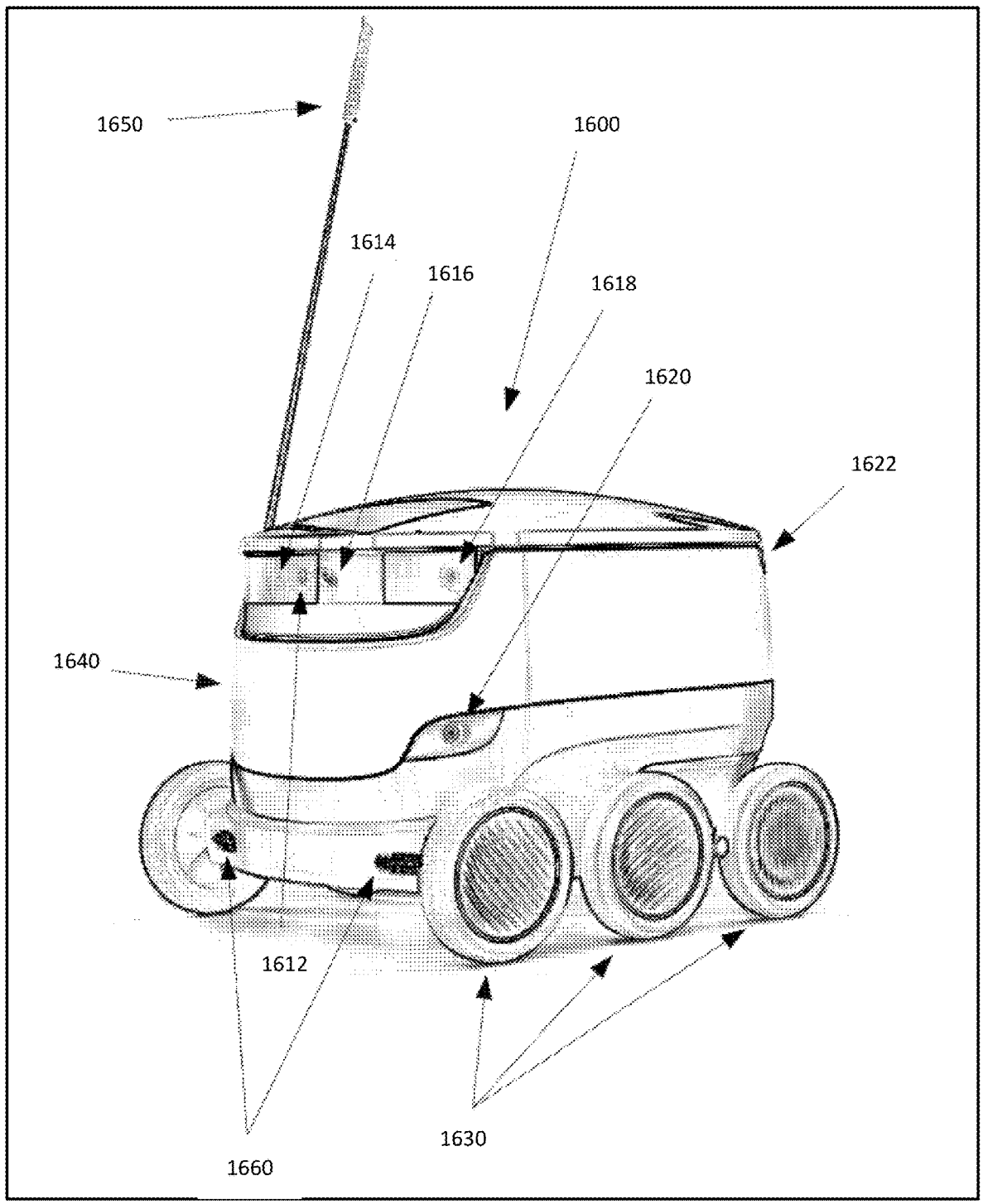
FIG. 16 is a schematic of a self-driving vehicle according to an embodiment of the disclosure.

FIG. 16 is a schematic of a self-driving delivery vehicle according to an embodiment of the disclosure. The self-driving delivery vehicle typically includes a computer control network for sensor reading, drive motor control, and external communication.

The self-driving delivery vehicle 1600 includes a body 1640. The body 1640 can comprise an item storage compartment in which items can be transported. The self-driving storage vehicle 1600 includes wheels 1630, for example six wheels 1630 to enable traversing over uneven terrain. The self-driving vehicle's processing component can actuate the wheels 1630. An antenna 1650 may be used for external communication. The self-driving delivery vehicle 1600 may include headlights 1660 to increase the vehicle's visibility.

The self-driving delivery vehicle 1600 comprises sensors such as cameras 1612, 1614, 1616, 1618, 1620, and 1622. The sensors can also comprise radar sensors, ultrasonic sensors, Lidar sensors, time of flight cameras and/or other sensors. One sensor can comprise a front camera 1612. The front camera 1612 can be generally forward facing. The sensors may also comprise front, side and/or back stereo cameras 1614, 1616, 1618, 1620, 1622. The front stereo cameras 1614 and 1616 can be slightly downward facing. The side stereo cameras 1618 and 1620 can be forward-sideways facing. There can be analogous side stereo cameras on the other side of the robot (not shown in the figure). The back stereo camera 1622 can be generally backward facing. The sensors present on multiple sides of the self-driving vehicle can contribute to its situational awareness.

The weight of one example of a self-driving delivery vehicle 1600 with a battery is about 23 kg. The example self-driving delivery vehicle 1600 may be equipped with a 1260 Wh battery, for a battery life of about 12 hours. The self-driving delivery vehicle 1600 is generally used for transporting goods. The example delivery vehicle 1600 can carry a load of up to 15 kg.

The computer control network may include a communication module to receive and transmit communication signals. The communication signals may include information from the video cameras and other sensors. Additional control information may be transmitted to the self-driving delivery vehicle 1600 as additional control information. The control network, various sensors and drive motors all require electric power.

Conventional self-driving vehicles rely on a relatively large battery pack as the source for electric power. Any component of the vehicle which can be made of CF can be embedded with energy storage solely or can be used in conjunction with a conventional battery back inside of the CF-energy embedded compartment. For example, the body 1640 and the enclosed item storage compartment can be made of carbon fiber. Some or all of the carbon fiber in the body 1640 and enclosed item storage compartment can be made using structural carbon fiber battery as a CF-embedded energy storage. As such, some or all of the added weight associated with a housing of a battery pack can be removed. Since the CF-embedded energy storage could be distributed over the entire structure, the weight balance can be improved.

In one embodiment, the CF-energy embedded compartment may be divided into sections, each section can be configured with a respective terminal. The sections may be arranged according to placement of motors and sensors. The control network, various sensors and drive motors can be connected to a terminal 1102 that is proximate to the respective sensor and drive motor. In some embodiments, there may be several structural CF batteries of a predetermined size, or sizes, and interconnected in series or parallel to provide a required voltage or current.

Figure 17:
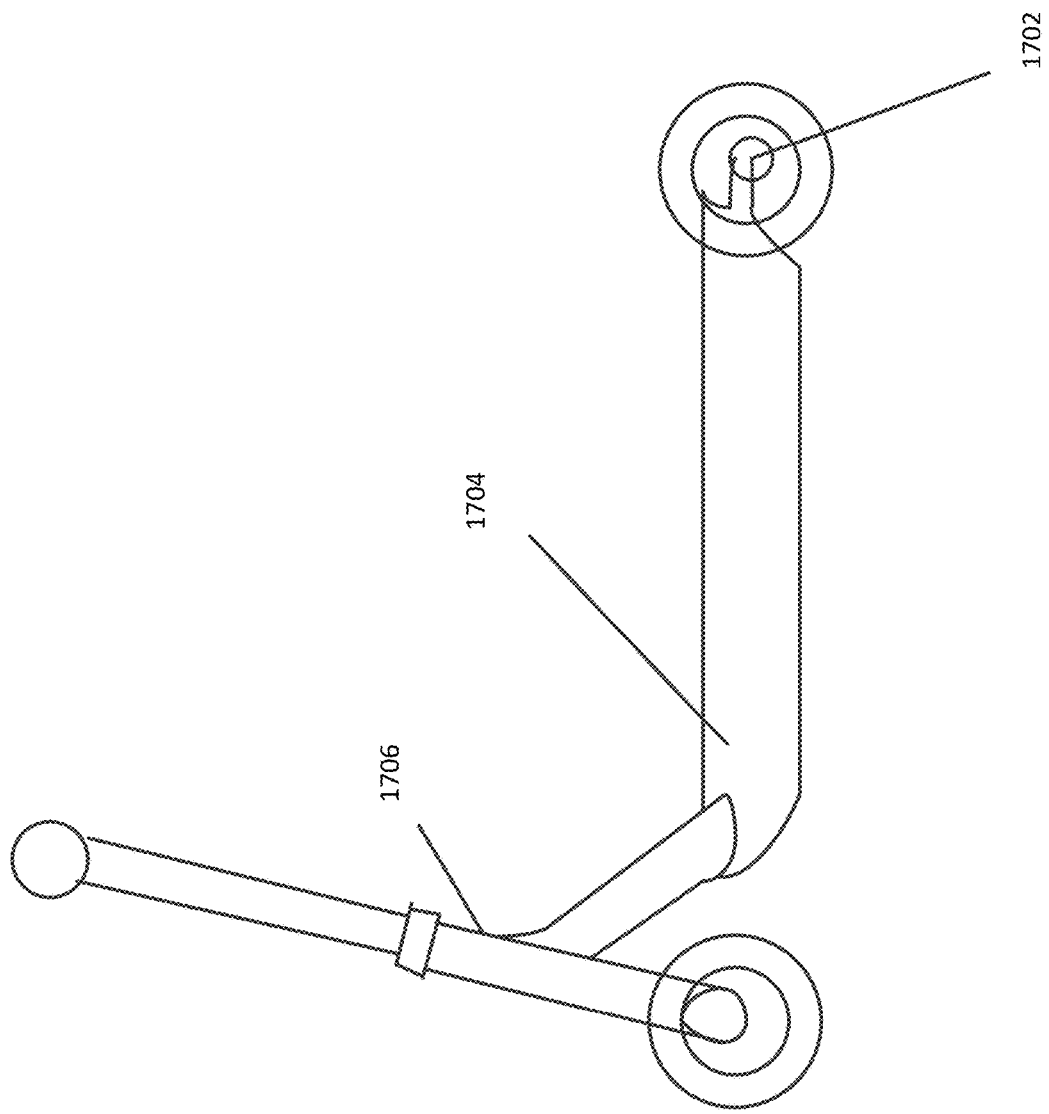
FIG. 17 is a schematic of an E-scooter according to an embodiment of the disclosure.

FIG. 17 is a schematic of a side-view of an E-scooter according to an embodiment of the disclosure. An E-scooter includes a motor, or a pair of motors, to drive a pair of wheels, and a communications module for external communication. Although a two wheel E-scooter is shown in FIG. 17, an E-scooter may include three, four, or more wheels. A motor may be included inside of the rear hub and is powered by a battery located along the mid-section between forward and rear wheels. One example conventional E-scooter has a 42 V battery that has a charge time of 6 hours. The example E-scooter is considered heavy at about 40 pounds, largely due to the weight of the battery. The large battery can take the e-scooter to an estimated range of about 40 miles. Another example conventional e-scooter has a 36 V removable battery. The distance that an E-scooter may travel is based on factors such as the weight of the passenger, the type of terrain that the scooter travels, type of tires, and others. However, an important factor is a tradeoff between battery size and travel distance. A large size battery weighs more but can achieve a greater average distance. A smaller battery weighs less, but will be limited to a shorter distance traveled between charges.

Referring to FIG. 17, the frame section 1704 can be configured as a structural CF battery to power a motor enclosed in the rear hub 1702. Additional components of the frame such as a stem 1706 may also be configured as a structural CF battery. Also, components of the drivetrain, such as front and/or rear hub may be configured as a structural CF battery. In some embodiments, there may be several structural CF batteries of a predetermined size, or sizes, and interconnected in series or parallel to provide a required voltage or current. Removal of, or reduction in size of a battery pack greatly reduces the weight of the E-scooter. Some or all of the added weight associated with a housing of a battery pack can be removed as well. Subsequently, most E-scooters can achieve longer run time than counterparts that depend solely on a battery pack to power the motor. Since the CF-embedded energy storage could be distributed over the entire structure, the weight balance can be improved as well.

Figure 18:
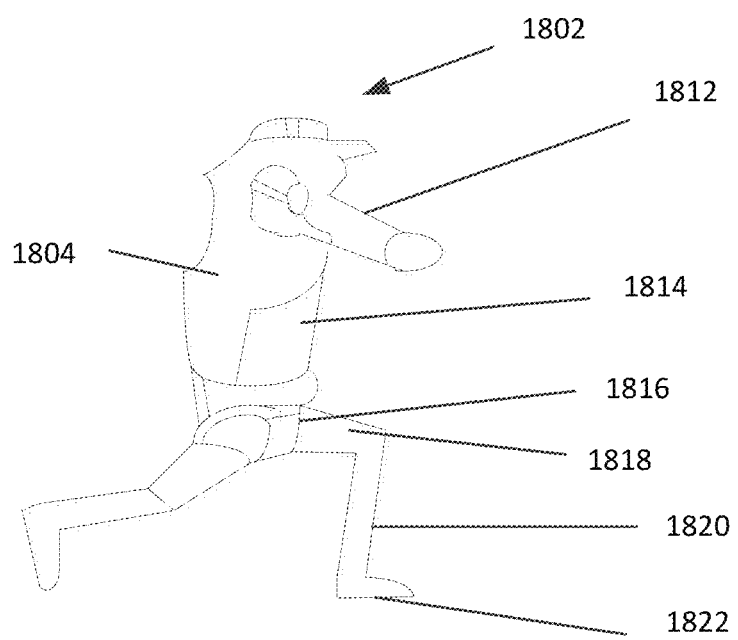
FIG. 18 illustrates a structural CF battery configured in the frame of a humanoid robot according to an embodiment of the disclosure.

FIG. 18 is a schematic of a structural CF battery formed as parts of a humanoid robot according to an embodiment of the disclosure. In an example humanoid robot, the battery pack 1804 is strapped to the back of an exoskeleton 1802 as a backpack. The battery pack 1804 powers one or more motors for maneuvering the exoskeleton 1802, as well as various sensors and devices. In particular, a humanoid robot, such as a humanoid robot shown in FIG. 18, may be configured with a variety of devices and sensors, including accelerometers, gyroscopes, force sensors, touch sensors, motors, computer processing devices, and communications devices. Subsequently, the battery pack 1804 can constitute about 20% of the total weight of the humanoid robot.

In one embodiment, parts of the exoskeleton are made of carbon fiber composite material and configured as structural CF batteries. Battery placement and weight is a significant issue when considering weight balance and humanoid robot stability. The power from the structural CF batteries may be used to provide at least some of the total power required for the various devices and sensors. Replacement of all or part of the backpack battery 1804 by the structural CF battery can simplify control over weight balance and stability. Also, a structural CF battery located on a particular part may be used to provide power for devices located on or proximate to the same particular part. For example, parts can include an arm 1812, chest 1814 (including back and shoulders), upper legs 1818 (thighs), lower legs 1820, hips 1816, and foot 1822 (including ankle). Each of these parts can include a force sensor. In some embodiments, where weight balance has been previously optimized, some or all of the structural CF batteries may be used to provide backup power, or an auxiliary power source for additional electronic devices. In some embodiments, a structural battery for a part may consist of structural CF batteries of a predetermined size, or sizes, and interconnected in series or parallel to provide a required voltage or current.

Figure 19:
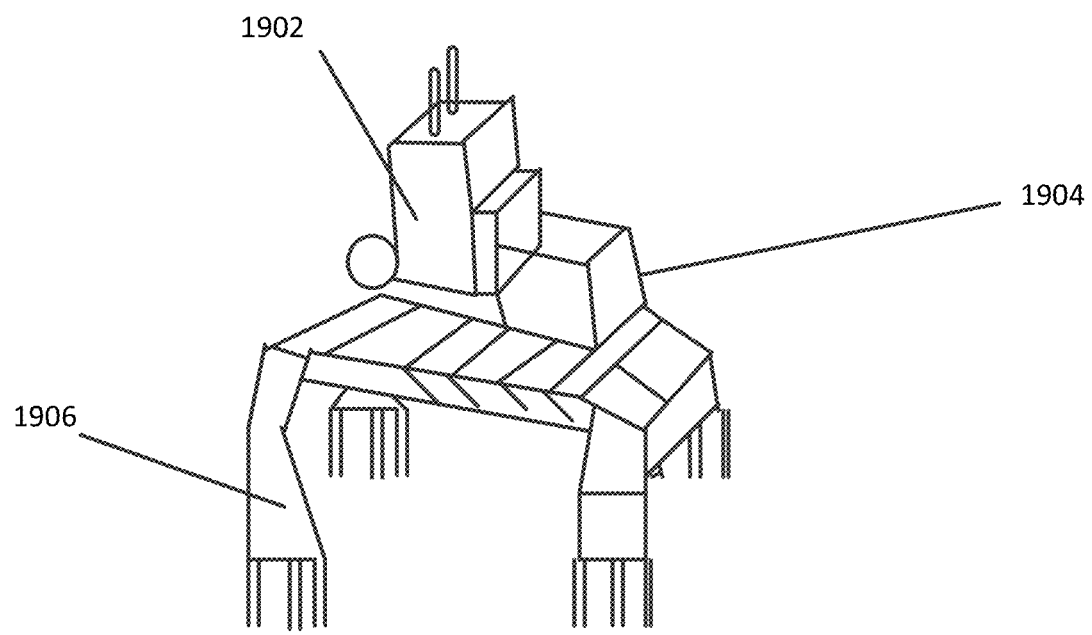
FIG. 19 illustrates a structural CF battery configured in the frame of a legged robot according to an embodiment of the disclosure.

FIG. 19 illustrates a structural CF battery configured in the frame of a legged robot according to an embodiment of the disclosure. The legged robot 1900 may contain four or more legs 1906 for mobility over rugged terrain. To maximize clearance, a battery and other electronics 1902 for controlling the legged robot 1900 is preferably included within a frame structure 1904 that the legs 1906 are attached, or on top of the frame structure 1906. The frame structure 1904 may be made small for increased maneuverability within various tight spaced environments. However, minimizing size can place limitations on the types and number of electronics, such as sensors. A majority of the space available for the electronics is used for the battery and battery housing. Removing the battery, and instead configuring the frame and legs as a coaxial arranged CF battery can increase space available for additional electronics for the legged robot 1900. The electronics may be directly connected to the structural CF battery at the position of the frame that they are mounted.

The above description is presented to enable a person skilled in the art to make and use the embodiments and aspects of the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. In this regard, certain embodiments within the disclosure may not show every benefit of the disclosure, considered broadly.

The invention claimed is:

1. An electric mobility apparatus, comprising:
at least one electric carbon fiber component;
the at least one electric carbon fiber component incorporating a structural battery, the structural battery including one or more energy storage devices;
each of the one or more energy storage devices having:
at least one anode core of a continuous carbon fiber,
an electrolyte arranged on the at least one continuous carbon fiber core, and
a cathode layer arranged on the at least one continuous carbon fiber core on the electrolyte; and
at least one interface electrically connected to the structural battery, the at least one interface for inputting power for charging the structural battery and for outputting power.

2. The electric mobility apparatus of claim 1, wherein each of the one or more energy storage devices having a laminate structure with:
at least one anode core of a plurality of continuous carbon fibers,
an electrolyte coating arranged on the plurality of continuous carbon fibers, and
a cathode layer arranged on the at least one continuous carbon fiber core on the electrolyte coating.

3. The electric mobility apparatus of claim 1, further comprising: a carbon fiber frame, at least part of the carbon fiber frame incorporating a section of the structural battery.

4. The electric mobility apparatus of claim 3, further comprising: a motor,
wherein the section of the structural battery provides power to the motor for driving the electric mobility apparatus.

5. The electric mobility apparatus of claim 4, further comprising two or more wheels, each wheel having a hub, and
wherein the hub includes the motor for driving the hub, thereby driving the electric mobility apparatus.

6. The electric mobility apparatus of claim 5, wherein the hubs constitute the at least one electric carbon fiber component, and
wherein at least one of the hubs include a power meter sensor which is powered by the structural battery incorporated in a respective said hub, the power meter sensor for measuring torque.

7. The electric mobility apparatus of claim 1, further comprising: at least one sensor,
wherein the structural battery incorporated in the electric carbon fiber component provides power to the at least one sensor for monitoring the electric mobility apparatus.

8. The electric mobility apparatus of claim 1, further comprising: a drivetrain,
wherein the at least one electric carbon fiber component is a foot pedal of the drivetrain, and
wherein the foot pedal includes a power meter sensor which is powered by the structural battery incorporated in the foot pedal, the power meter sensor for measuring torque.

9. The electric mobility apparatus of claim 1, further comprising: a drivetrain,
wherein the at least one electric carbon fiber component is a crank arm of the drivetrain, and
wherein the crank arm includes a power meter sensor which is powered by the structural battery incorporated in the crank arm, the power meter sensor for measuring torque.

10. The electric mobility apparatus of claim 1, further comprising: a drivetrain,
wherein the at least one electric carbon fiber component is a chainring of the drivetrain, and
wherein the chainring includes a power meter sensor which is powered by the structural battery incorporated in the chainring, the power meter sensor for measuring torque.

11. An electric mobility apparatus, comprising:
at least one electric motor;
at least one electric carbon fiber component incorporating a structural battery, the structural battery including one or more energy storage devices;
each of the one or more energy storage devices having:
at least one anode core of a continuous carbon fiber,
an electrolyte arranged on the at least one continuous carbon fiber core, and
a cathode layer arranged on the at least one continuous carbon fiber core on the electrolyte; and
the structural battery outputting power for driving the electric motor, thereby driving the electric mobility apparatus.

12. The electric mobility apparatus of claim 11, wherein each of the one or more energy storage devices having a laminate structure with:
at least one anode core of a plurality of continuous carbon fibers,
an electrolyte coating arranged on the plurality of continuous carbon fibers, and
a cathode layer arranged on the at least one continuous carbon fiber core on the electrolyte coating.

13. The electric mobility apparatus of claim 11, further comprising a carbon fiber body and an enclosed storage compartment, wherein at least part of the carbon fiber body incorporates a section of the structural battery.

14. The electric mobility apparatus of claim 11, further comprising: at least one sensor,
wherein the structural battery incorporated in the electric carbon fiber component provides power to the at least one sensor for monitoring the electric mobility apparatus.

15. The electric mobility apparatus of claim 11, further comprising:
three or more wheels;
a carbon fiber body incorporating a portion of the structural battery,
wherein the portion of the structural battery incorporated in the carbon fiber body provides power to the at least one electric motor for rotating the three or more wheels, thereby driving the electric mobility apparatus.

16. The electric mobility apparatus of claim 11, further comprising: a plurality of camera sensors,
wherein the structural battery is divided into sections, each section of the structural battery includes a terminal for outputting power, and
wherein each of the plurality of camera sensors is electrically connected to the terminal that is proximate to a respective one of the plurality of camera sensors.

17. The electrical mobility apparatus of claim 11, further comprising a carbon fiber platform having a substantially rectangular surface as a seat or a step, between a front wheel and a rear wheel,
wherein at least part of the carbon fiber platform incorporates a section of the structural battery.

18. The electric mobility apparatus of claim 17, wherein the rear wheel includes a hub enclosing a motor, and
wherein the section of the structural battery provides power to the motor for driving the electric mobility apparatus.

19. The electric mobility apparatus of claim 18, further comprising: at least one sensor,
wherein the hub constitutes the at least one electric carbon fiber component,
the structural battery incorporated in the electric carbon fiber component provides power to the at least one sensor for monitoring the electric mobility apparatus.

20. The electric mobility apparatus of claim 11, further comprising: an exoskeleton having a plurality of interconnected exoskeleton carbon fiber components that incorporate a section of the structural battery.

* * * * *